Nov. 2, 1948.  W. UMBDENSTOCK  2,452,702
DRILL GRINDING MACHINE
Filed Dec. 18, 1944  4 Sheets-Sheet 1

Inventor
Walter Umbdenstock
By: Spencer, Marzall, Johnston & Cook
Attys

Nov. 2, 1948.   W. UMBDENSTOCK   2,452,702
DRILL GRINDING MACHINE
Filed Dec. 18, 1944   4 Sheets-Sheet 2

Inventor:
Walter Umbdenstock
By: Spencer, Marzall, Johnston & Cook
Attys

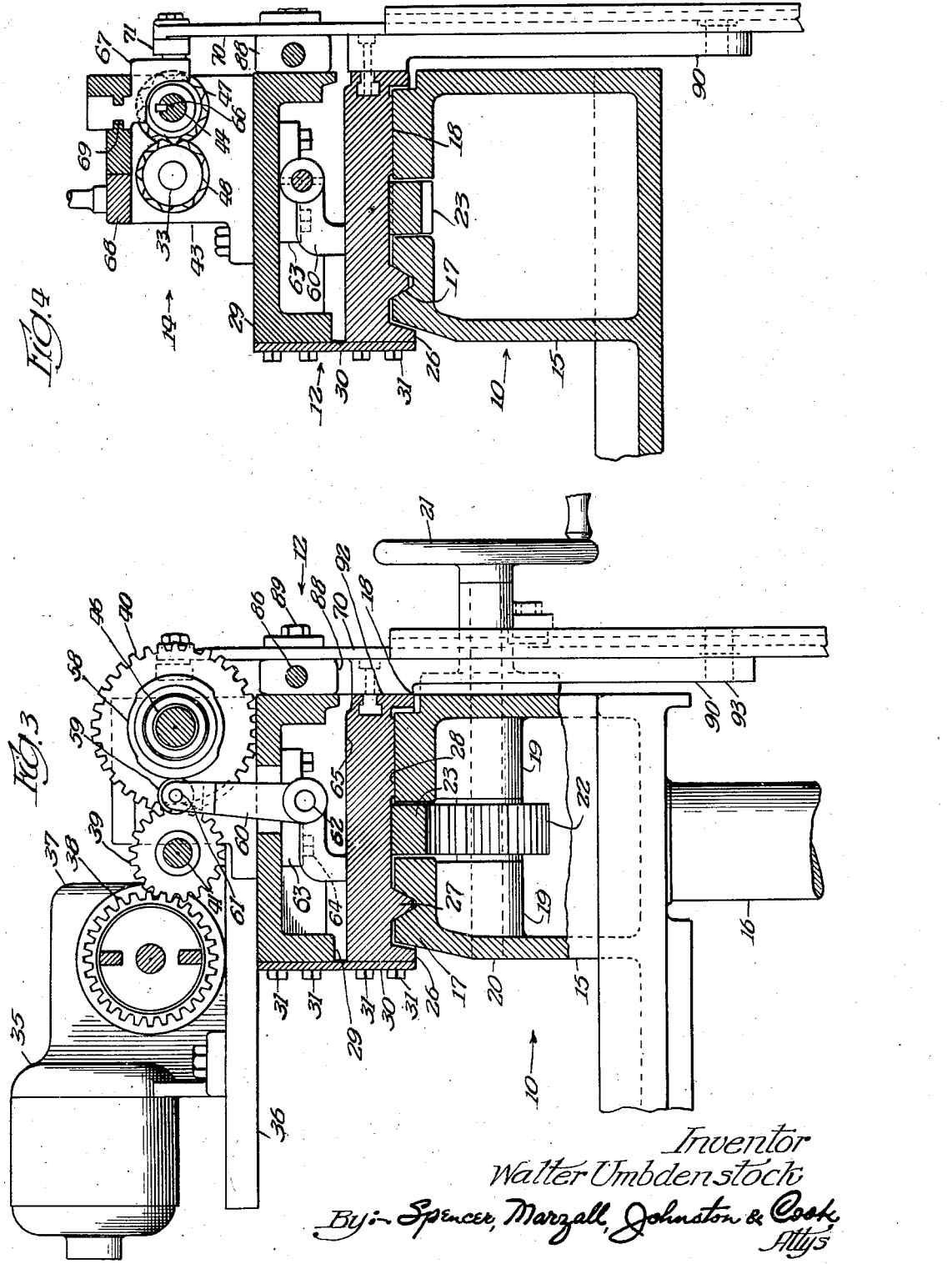

Nov. 2, 1948.   W. UMBDENSTOCK   2,452,702
DRILL GRINDING MACHINE
Filed Dec. 18, 1944   4 Sheets-Sheet 4
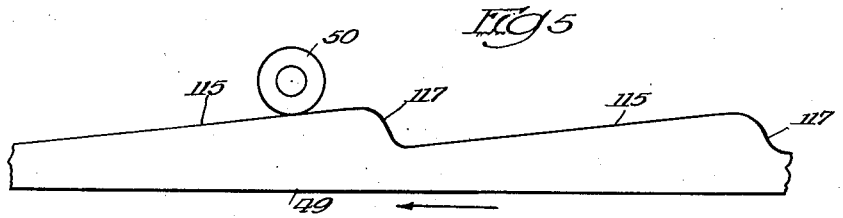
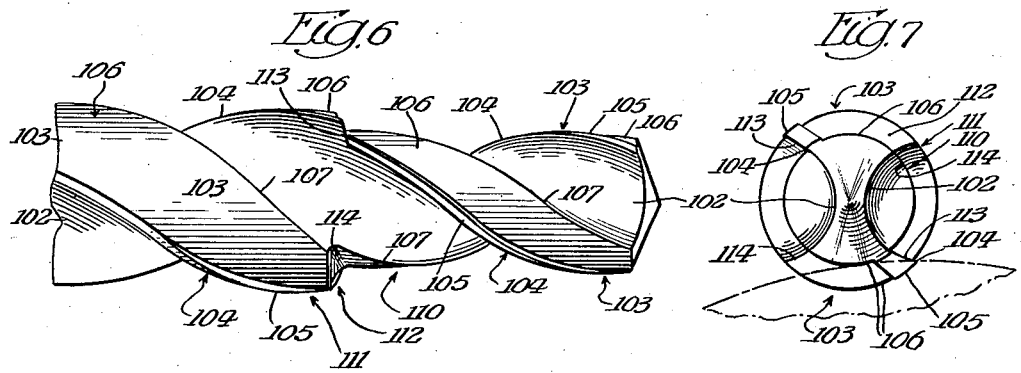
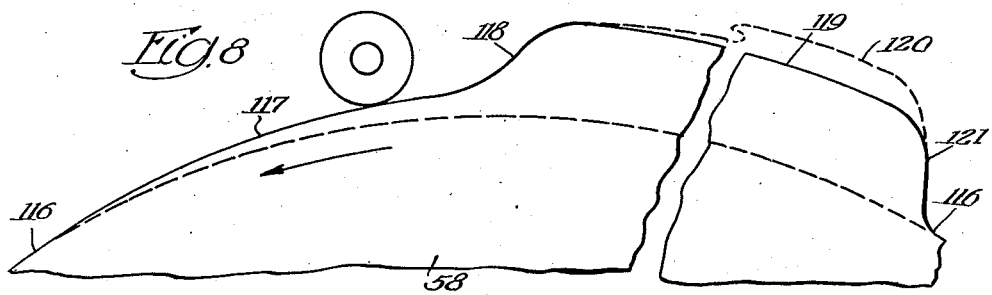
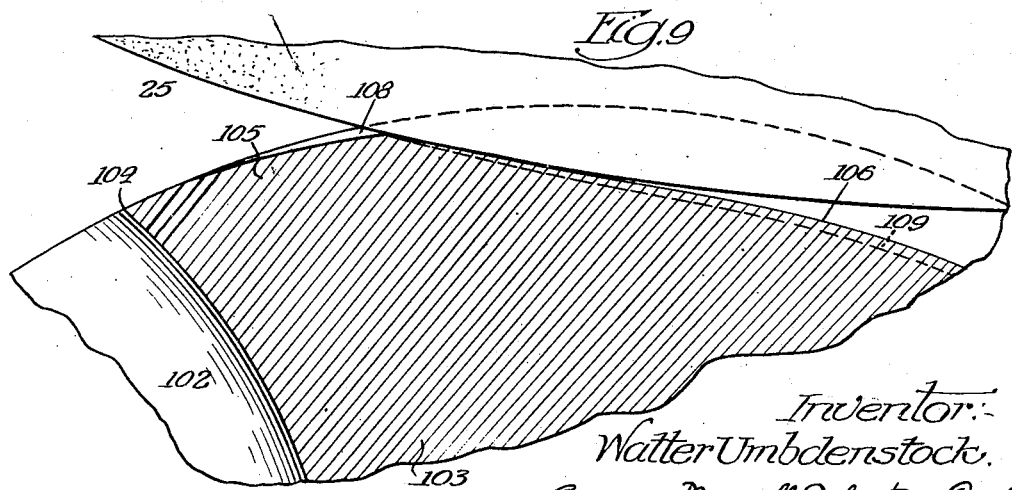

Patented Nov. 2, 1948

2,452,702

UNITED STATES PATENT OFFICE 2,452,702

DRILL GRINDING MACHINE

Walter Umbdenstock, Chicago, Ill., assignor to Lion Manufacturing Corporation, Chicago, Ill., a corporation of Illinois Application December 18, 1944, Serial No. 568,607

9 Claims. (Cl. 51—94)

The present invention relates in general to means for and methods of grinding, and has more particular reference to the production of twist drills by grinding suitable drill blanks; the invention further relating to novel features in drills produced in accordance with the teachings of the present invention.

An important object of the invention is to provide for moving a work piece comprising a drill blank laterally toward and away from a grinding element, in timed relationship with respect to the rotation of the work piece, to provide lands along the leading or cutting edges of the finished drill.

Another important object is to provide for reciprocating a rotating work piece longitudinally with respect to a grinding member, and in timed relationship with respect to the rotary movement of the work piece, in order to form a finished drill having a ground shoulder or step therein, which step has a helical configuration; a further object being to provide for moving the work piece, simultaneously, in a direction laterally toward and away from the grinding element, and, reciprocably, in a direction transversely of the grinding element and axially of the work piece, said movements being accomplished in timed relationship with respect to the rotation of the work piece.

Another object of the invention is to provide for grinding helical surfaces in a work piece while the same is being rotated.

Another object is to provide automatic mechanism adapted to coordinate the feed of the grinding operation to the helix of the lands being ground.

Still another object is to provide a new advancing and retarding mechanism for use in a drill grinding machine, which is adapted to advance or retard the rotation of the drill being ground in coordination with the helix of the lands being ground.

A further object of the invention is to provide advance and retard mechanism of the type described above in which the operating mechanism is centered about two simple and direct acting mating helical gears.

Another object is to utilize a cam for controlling the lateral movement of the work piece toward and away from the grinding element during the grinding operation; a further object being to provide simplified means for advancing or retarding the action of said cam in proportion to the longitudinal feeding movement of the work piece with respect to the grinding element, whereby to allow for the grinding of helical lands at the cutting edges in making a finished drill.

Another important object is to utilize a cam for controlling longitudinal reciprocating movement of the work piece with respect to the grinding element, for the purpose of grinding a helical step in the work piece in forming a stepped drill.

Another important object is to provide an improved method of grinding drills to form lands along the lateral cutting edges of the drill by rotating a work piece adjacent a grinding element and moving the work piece laterally toward and away from the grinding element in timed relationship with respect to the rotation of the work piece and in conformity with the sectional shape of the land to be formed, while advancing or retarding such grinding movement in proportion to longitudinal movement of the work piece with respect to the grinding element, in order to conform the lands with the lateral cutting edges of the drill.

Another important object is to provide an improved method of grinding drills having helical steps therein by reciprocating a rotating drill blank or work piece, in timed relation with respect to the rotation thereof, in grinding relationship with respect to a grinding element, and controlling such reciprocating movement so as to form a shoulder, in the drill blank, having a desired helical shape.

Other objects, advantages, and inherent functions of the invention will become apparent as the same is more fully understood from the following description, which, taken in connection with the accompanying drawings, discloses a preferred embodiment of the invention.

The accompanying drawings illustrate a selective embodiment of the invention in which Fig. 1 is a plan view of a drill grinding machine embodying the invention and showing a laterally and longitudinally reciprocable chuck for presenting a work piece to a grinding wheel in accordance with the present invention;

Fig. 3 is a partial sectional view in detail on the line 3—3 of Fig. 2;

Fig. 4 is a detail sectional view on the line 4—4 of Fig. 1;

Fig. 5 is a developed circumferential view of cam means for controlling the longitudinal reciprocation of the work piece;

Fig. 6 is a longitudinal view of a drill which the drill grinding machine is adapted to grind, showing the helical shape of the lands and of the step shoulder;

Fig. 7 is an end view of the drill;

Fig. 8 is a fragmentary view of a cam for controlling the relative land grinding movement of the work piece and grinding element in a direction laterally of the work piece; and Fig. 9 is an enlarged fragmentary sectional view taken through the work piece showing the land and the relative position of the grinding wheel during the land grinding operation.

Figure 1:
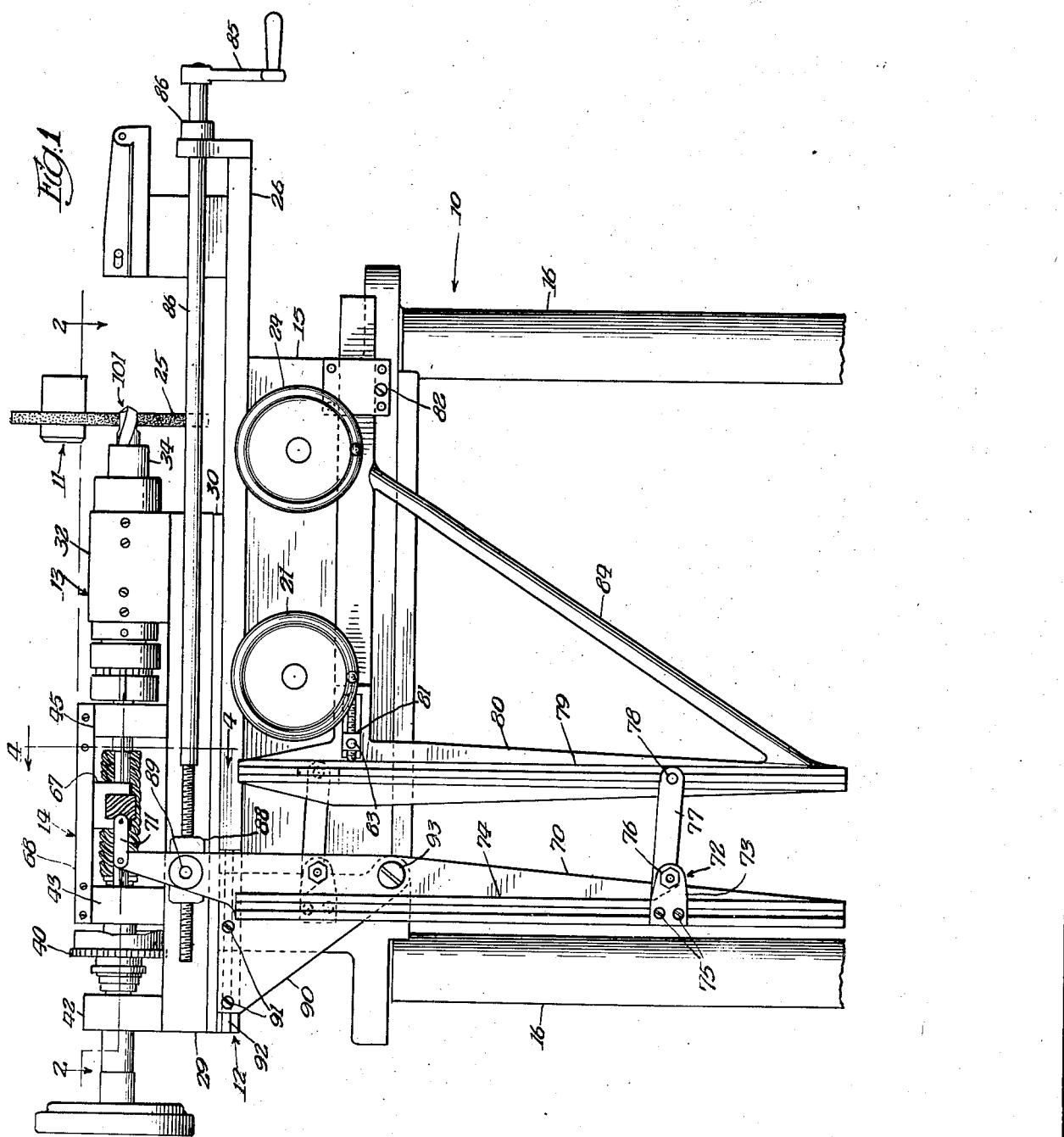
Figure 2:
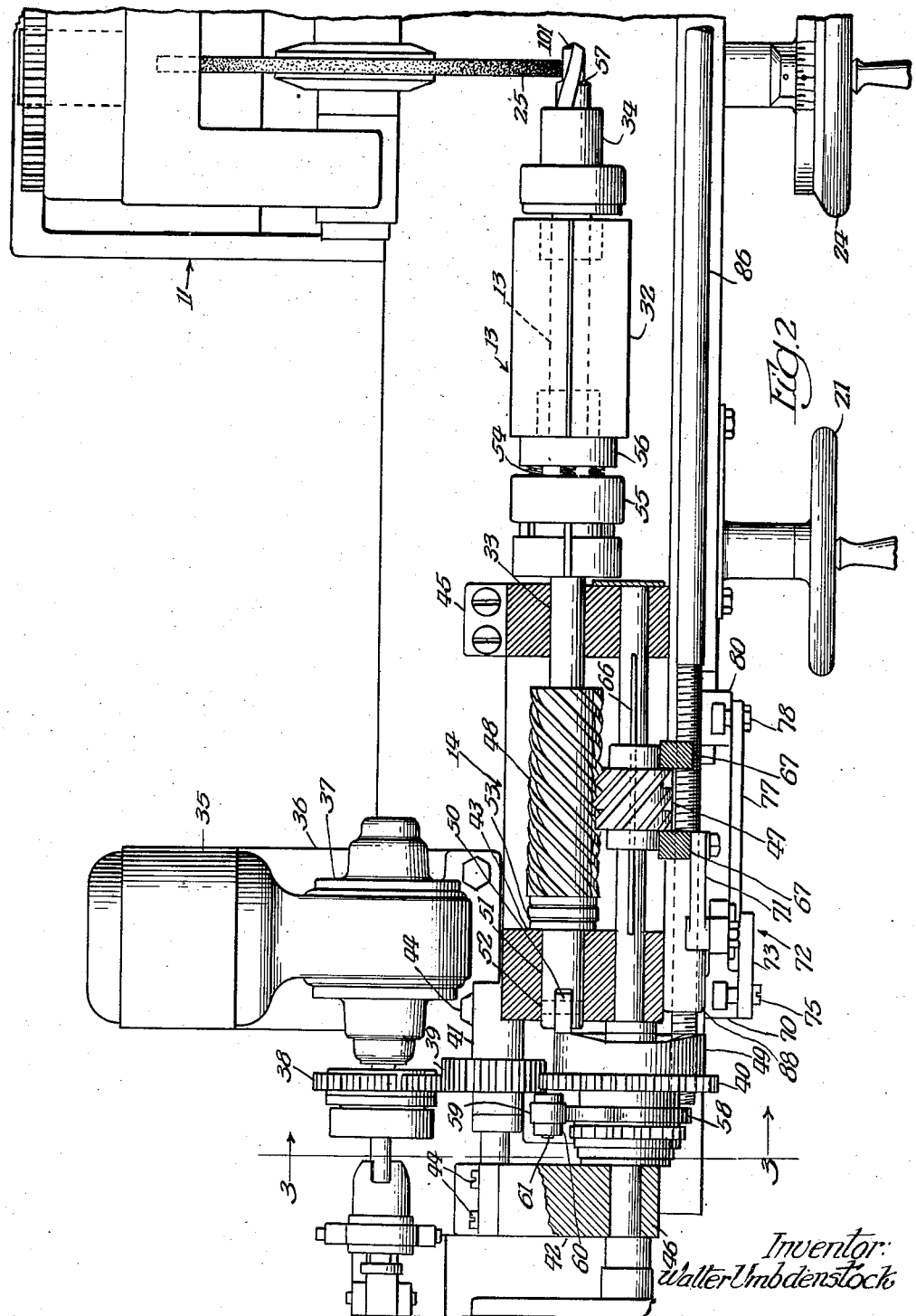
Fig. 2 is a partial sectional view in detail on the line 2—2 of Fig. 1.

To illustrate the invention, the drawings show a machine for grinding work pieces comprising drill blanks in the production of drills. The drawings also show a finished drill more particularly in Figs. 6 and 7. It should be understood that a drill may be formed, by grinding, from a work piece or blank 101, comprising a cylindrical rod having a groove or grooves 102 formed therein and defining flutes 103 in the work piece. The grooves and flutes are usually of helical configuration although they may, of course, be straight lateral grooves and flutes in the drill blank. The leading edge of each flute forms a lateral cutting edge 104 of the drill, and the present invention relates to the formation of a raised portion or land 105 in each flute at and adjacent, and behind and extending along the cutting edges of the drill, by undercutting the surface of each flute, as at 106, from the trailing edge of the land 105 to the trailing edge 107 of the flute.

The invention also contemplates particularly the relieving or cutting back of the lands to an appreciable extent behind the cutting edges of the drill, the lands being relieved uniformly and progressively from the leading to the trailing edges thereof, as shown at 108, and, if desired, the undercut portions of the flutes rearwardly of the lands may also be relieved progressively from the trailing edges of the lands to the trailing edges of the flutes, as indicated by the dotted line 109 in Fig. 9.

The invention also contemplates the provision of means for controlling the grinding operation, in the formation of stepped drills. A stepped drill, of course, comprises a drill having a tip portion 110 of relatively small diameter and one or more body portions 111 of larger diameter adjacent and behind the tip, the tip and body portions being interconnected by a shoulder 112 either inclined or at right angles with respect to the axis of the drill and having a cutting edge 113 joining the cutting edges 104 of the tip and body portions. The shoulder, also, is preferably joined to the body and tip portions by means of a curved fillet to avoid formation of burrs in holes cut by the finished drill. It should be understood, of course, that a stepped drill may have one or more shoulders and two or more drill portions of unlike diameter. The present invention contemplates the grinding of the work piece in such fashion that the leading or cutting edge 113 of the step or shoulder is offset forwardly, that is to say, in the direction of the tip of the drill, with respect to the trailing edge 114 of the shoulder or step, whereby the leading edge of the step may constitute a cutting edge 113 which interconnects the lateral cutting edges in the drill portions on either side of the shoulder.

The foregoing purposes are accomplished by providing a grinding machine in which a drill blank or work piece may be rotated, in grinding position, preferably at uniform speed. The grinding machine, of course, includes a grinding element, which preferably comprises a grinding wheel 25; and the machine includes mechanism for periodically moving the grinding wheel and work piece toward and away from each other in a direction laterally of the work piece, such movement being in timed relationship with respect to the rotation of the work piece so that grinding engagement between work piece and grinding wheel may be accomplished when the flutes 103 of the blank are facing the grinding wheel. The mechanism also is controlled preferably by means of a peripheral cam 58 so that the relative grinding movement, between wheel and work piece, in a direction laterally of the work piece, is in conformity with the desired circumferential shape to be formed in the surfaces of the drill flutes to provide lands at the cutting edges of the drill having the desired relief 108 rearwardly of such cutting edges, including undercut flute portions 106 rearwardly of the lands. The mechanism may also be controlled, in grinding a stepped drill, preferably by another cam 49 serving to relatively reciprocate the work piece and grinding element in a direction longitudinally of the work piece, such reciprocating movement being controlled in conformity with the desired helical shape to be imparted in the step or shoulder 112 to be formed in the drill.

The drill grinding machine herein described includes some of the features contained in a copending application filed by this applicant on October 30, 1943, as Serial No. 508,281, now Patent No. 2,443,194, dated July 13, 1948. However, the machine disclosed herein embodies additional features not found in said copending application.

The drill grinding machine herein disclosed embodies a machine base 10. A suitable grinder head 11 is supported on the base 10 and a reciprocable carriage or table 12 is mounted for longitudinal movement upon the upper surface of the machine base 10. The table 12 forms a suitable support for a work head 13. This work head 13 is adapted to support a work piece or drill blank in grinding position with respect to the grinding element 11. The table 12 also supports advancing and retracting mechanism 14 for relatively moving the work piece and grinding element, during the grinding operation, in accordance with the present invention.

Machine base

The machine base 10 comprises a central box shaped casting 15, which is supported by a plurality of sturdy columnar legs 16. The upper surface of the central casting is provided with two slide or guide ways 17 and 18, upon which the reciprocable table 12 may be mounted for longitudinal movement, as shown more particularly in Fig. 3. The longitudinal way 17 is V-shaped so that the reciprocable table 12 may be accurately aligned on the machine base 10, whereas the way 18 is flat so that it will not interfere with the aligning function of the V-shaped way 17. The upper portion of the central casting 15 is made in the form of a hollow box so as to reduce the weight of the central casting and still provide sufficient rigidity for accurate grinding operations. Bearings 19 are preferably cast integrally with the central casting 15 and form a mounting which supports a traverse shaft 20 for free rotation. The traverse shaft 20 may be rotated by hand wheel 21 located in front of the machine and securely fastened to the traverse shaft. Rotation of the hand wheel 21 and the traverse shaft 20 turns a pinion 22 which is securely fastened to the traverse shaft and imparts a longitudinal traverse movement to the reciprocable table 11 through a rack 23 which is secured to the lower surface of the reciprocable table and depends downwardly from the table through a suitable opening in the upper surface of the central casting 15.

The front surface of the central casting 15 also supports a hand wheel 24 which may be associated with any conventional mechanism to cause transverse movement of the grinder head 11.

Grinder head

The grinder head 11 is mounted at the right rear of the machine base 10 and may be of any conventional form provided it supports a grinding wheel 25 for uniform rotation. In addition, the grinder head 11 should be provided with means for tilting the axis of rotation of the grinding wheel 25 and securing the same at any desired inclination so that its cutting angle may be varied in accordance with the work piece being ground.

The reciprocating table

The reciprocable table 12 comprises a generally flat and heavy metallic slab 26 upon which many of the operating parts of the machine are mounted. The lower surface of the slab 26 is provided with bearing extensions 27 and 28. The bearing extension 27 is constructed in the form of a longitudinally extending rib whereas the bearing extension 28 is formed with a flat bearing surface. The bearing extensions 27 and 28 mate respectively with the ways 17 and 18 and provide for guided longitudinal movement of the reciprocable table 12 upon the machine base 10. The rack 23 may be secured rigidly to the lower surface of the metallic slab 26 by any suitable means.

A second metal slab 29 is arranged in substantially parallel overlying relation with respect to the slab 26. The slab 29 is spaced from the slab 26 and the two slabs are secured together at their rear edges by means of a flexible metal strip 30. This strip 30 is secured to the slabs 26 and 29 by means of a plurality of cap screws 31. The use of the flexible metal strip 30 as a fastening between the slabs 26 and 29 imparts a flexible hinge-like mounting whereby the slab 29 may be tilted or rocked vertically with respect to the slab 26.

The work head

The work head 13 is mounted upon the upper surface of the slab 29 and comprises a main bearing block 32 in which a spindle 33 is mounted for rotation. A chuck 34 is mounted in the spindle 33 and provides a suitable holder for a work piece 94.

The spindle drive motor 35 is secured to a bracket 36 which is fastened to the upper surface of the metal slab 29. The drive from the motor 35 is transmitted through a suitable gear box 37 to a spur gear 38. Power from the spur gear 38 is transmitted to a chain of gears comprising gears 39 and 40. The gear 39 is supported upon a shaft 41 which, in turn, is mounted upon two bearing blocks 42 and 43 by means of screws 44. The bearing blocks 42 and 43 are mounted in spaced relation upon the upper surface of the metallic slab 29, and a third bearing block 45 is also supported upon the upper surface of the slab 29 in position spaced from the bearing blocks 42 and 43. The bearing blocks 43 and 45 rotatably support the spindle 33, and all three bearing blocks 42, 43 and 45 rotatably support a drive shaft 46. The gear 40 is secured to the drive shaft 46 and, accordingly, is rotated by the motor 35 through the gear box 37 and the chain of gears comprising gears 38, 39 and 40. A helical gear 47 is mounted for rotation with the drive shaft 46 and mates with another helical gear 48 mounted for rotation on the spindle 33 so that the chuck 34 may thereby be rotated.

Means is provided to axially reciprocate the chuck 34 in timed relation with its rotation. This means comprises a face cam 49 and a cam follower 50. The cam follower 50 is, preferably, a roller rotatably supported at the end of a thrust transmitting member 51 by means of a shaft 52. The member 51 bears against a thrust bearing 53, which in turn bears against an end of the spindle 33. The spindle 33 is resiliently urged toward the bearing 53 and thrust member 51 by any suitable means, such as springs 54 which are compressed between a collar 55 secured to the spindle 33 and a collar 56 rotatably mounted at the end of the main bearing block 32. The cam surface of the face cam 49 may be formed to correspond to the number of lips of the drill being ground, and to the extent of back-off or clearance desired between the leading and trailing edges of the shoulder or step of the drill being ground.

In Fig. 5 is shown the developed circumferential shape of a face cam 49 suitable for use in grinding the helical shoulder 112 in a stepped drill embodying two flutes, the face cam comprising two identical portions, one for each flute, and said portions having each a uniformly inclined cam section 115 for thrusting the shaft 33 and consequently the chuck 34 and the work piece therein progressively toward the grinding wheel as the cam follower 50 rides up such inclined portion 115, thereby causing the grinding wheel to cut the shoulder 112 progressively further from the tip of the work piece commencing at the leading edge and progressing toward the trailing edge of the shoulder in one flute. After the flute being ground has passed away from the grinding wheel through the turning of the work piece, the cam follower will ride upon a cam portion 117 forming a sharp declivity, allowing the spindle or shaft 33 and the chuck 34 carrying the work piece, to move in a direction withdrawing the shoulder 112 from the grinding wheel in an axial direction during the period, in the rotation of the work piece, while a groove 102 is opposite the grinding wheel. The work piece is thus retracted to a position in which the grinding wheel may properly grind the leading edge 113 of the next flute when the work piece turns into grinding position, the shape of the shoulder in such flute being determined by the inclination of the second cam portion 115.

In addition, means are provided to reciprocate the work piece carried by the chuck 34 transversely in timed relation with the rotation of the work piece so that back-off or clearance may be provided upon the lips of the lands of the drill. This means comprises a peripheral cam 58 and its associated mechanism. The peripheral cam 58 is secured on the drive shaft 46 and co-acts with a rotatable cam follower 59, which is rotatably mounted upon the upper end of a crank 60 by means of a pin 61. The crank 60 is fulcrumed upon a pin 62 and the pin 62 is mounted in a bracket 63 which is secured to the lower surface of a recess in the slab 29 by means of cap screws 64. The lower end of the crank 60 bears against the upper surface of the slab 26 at the point designated generally by the numeral 65 in Fig. 3. As the crank 60 is rocked to and fro through the action of the cam 58 on the cam follower 59, the slab 29 will be raised and lowered with respect to the slab 26 and tilted about an axis comprising the flexible metal strip 30. The lower end of the crank 60 is constantly urged in contact with the upper surface of the slab 26 through the weight of the slab 29 and all of the elements carried thereby. The contour of the peripheral cam 58 is selected to correspond with the number of flutes on the work piece and with the shape of the lands and the degree of back-off or clearance desired upon each of the lands.

The fragmentary showing made in Fig. 8 of the drawings illustrates a working section of the cam 58, and it should be understood that the cam will have as many sections as there are flutes in the drill being ground. Since the cam controls the movement of the work piece laterally toward and away from the grinding wheel in order to determine the shape of the flute, the cam 58 comprises a disc having a portion 116 of normal diameter corresponding with the maximum diameter of the drill at its cutting edges 104. Adjacent and connected with this cam portion 116, the cam comprises a uniformly inclined portion 117, which is designed to move the cam following roller 59 gradually outwardly, thereby tilting the plate 29 and progressively moving the work piece against the grinding wheel 25 during the grinding of the flute-land 105 including the relieving of the same, as indicated at 108. If no relief of the trailing portions of the land is desired, the cam 58 will have no inclination in its portion 117 but said portion will have a basic diameter of the portion 116. The portion 117, however, merges into a relatively steep shoulder 118 up which the cam following roller 59 will ride at the conclusion of the land grinding stroke to promptly move the work piece and grinding wheel into the relative positions illustrated in Fig. 9 of the drawings, in order to undercut the surface of the flute rearwardly of the land 105. After riding the cam section 118, the cam following roller 59 will ride upon a cam portion 119 in order to hold the work piece in position against the grinding wheel to form the undercut drill portion 106. If this undercut portion is to be of uniform depth from the trailing edge of the land 105 to the trailing edge of the flute, the cam portion 119 may be of uniform diameter. If, however, it is desired that the undercut portion of the flute be of progressively increasing depth toward the trailing edge of the flute, as indicated in dotted lines at 109 in Fig. 9, the cam portion 119 may be of progressively increasing diameter, as indicated in dotted lines at 120 in Fig. 8. After the flute being ground has rotated past the grinding wheel so that the wheel is opposite the groove, defining the trailing edge of the flute, the cam follower 59 will ride down a sharply declining cam portion 121 joining the end of the cam portion 119 with a following cam portion of uniform diameter 116 so as to retract the work piece from the grinding wheel, while the same is opposite a groove, into position to repeat the grinding cycle on the next succeeding groove presented to the grinding wheel.

The face cam 49 and the peripheral cam 58 are each independently secured to the shaft 46 by means of set screws or the like, not shown, so that both the axial reciprocation and the transverse reciprocation of the work piece may be adjusted to suit the particular work piece being ground. Since the cams are driven directly from the same source of power as that which rotates the work piece, the reciprocation of the work piece is in synchronism with its rotation.

*Advancing and retarding mechanism*

The majority of the work pieces upon which a grinding machine of the disclosed type is used are provided with helical rather than straight flutes. Accordingly, means is provided for advancing or retarding the rotation of the work piece with respect to its transverse reciprocation, the advancement or retardation being proportional to the longitudinal feeding movement of the work piece with respect to the grinding wheel. This advancing and retarding action is accomplished by shifting the helical gear 47 longitudinally upon its drive shaft 46, in accordance with the feeding movement of the carriage 12. Any suitable means may be provided to permit the longitudinal shifting of the helical gear 47. As shown, a long key 66 is imbedded in the drive shaft 46 and mates with a suitable slot in the bore of the helical gear 47. Naturally comparable means, such as a spline or the like, may be substituted.

As the helical gear 47 is shifted longitudinally in one direction, the rotation of the chuck 34 will be advanced with respect to its reciprocation, and vice versa. Means is provided to shift the gear 47 in synchronism with the feeding movement of the work piece so as to coordinate the advance or retardation of spindle rotation with the helical shape of the land being ground. A collar 67 embraces the ends of the gear 47 and is slidably mounted in the upper plate 68 of the advancing and retarding mechanism 14. The upper plate 68 is secured to the bearing blocks 43 and 45 and is provided with tongued ways which co-act with mating grooves in the collar 67, as at 69, in Fig. 4.

The collar 67 is longitudinally shifted through the action of a lever arm 70. The collar 67 is connected to the upper end of the lever arm 70 through the medium of a connecting link 71. The lever arm 70 is provided with a shiftable fulcrum 72 which may be set in any preselected position to give any desired length of lever arm. This fulcrum comprises a shiftable dog 73, which is vertically slidable on a way 74. The way 74 forms an integral part of the lever arm 70 and the dog 73 is secured at any desired position by means of set screws 75. The dog 73 is provided with a nut and bolt 76, the bolt of which fits into a slot along the lower edge of a link 77. This link 77 is pivotally mounted, as at 78, to a way 79 which is integral with an L-shaped arm 80. The arm 80 is secured to the casting 15 of the base 10 by means of brackets 81 and 82. The arm is slidable in the brackets so as to permit a longitudinal adjustment of the fulcrum 72 and it may be secured in any shiftable position through the tightening of a set screw 83. The right hand bracket 82 loosely embraces the L-shaped arm so as to permit an easy shifting when the set screw 83 is loosened. The arm 80 is also provided with a brace 84 so that rigidity is insured.

The lever arm 70 is shifted about its fulcrum 72 through the medium of a crank 85. The crank 85 is located at the right end of a shaft 86 and this shaft 86 is journaled in a bearing 87, which is secured to the right end of the metal slab 26 of the reciprocable table 12. The left end of the shaft 86 is screw-threaded and mates with a nut 88, which is fastened to the lever arm 70, as at 89. As the crank 85 is turned in one direction, the nut 88 will be fed upon the threaded end of the shaft 86 and will cause the lever 70 to move the collar 67 to the right. If the crank 85 is rotated in the opposite direction, then the reverse occurs.

The longitudinal shifting of the collar 67 is synchronized with the longitudinal movement of the table 12. This synchronism is accomplished by having both the table and the fulcrum shifted by the same lever arm. A triangular shaped bracket 90 is secured by means of screws 91 to a way 92 on the front face of the slab 26. The bracket 90 may be shifted longitudinally and is maintained at its shifted position by means of the screws 91. The lever arm 70 is pivotally mounted upon the lower end of the bracket 90, as at 93.

Any desired synchronism between the longitudinal shifting of the table 12 and the advancing or retardation of the spindle rotation may be accomplished by varying the position of the fulcrum 72. As the fulcrum 72 is moved toward the pivot 93, the rate of retardation or advancement of the rotation of the spindle with respect to the longitudinal movement of the table will increase, and as the fulcrum 72 is moved about the pivot 93, as for instance to the dotted line position in Fig. 1, a reversal in advancement or retardation with respect to the table movement will take place.

The use of the shiftable fulcrum 72 and the provision for so shifting it that the advancement or retardation of the spindle may be reversed with respect to the table movement, enables this machine to be used upon both right and left hand drills and upon lips of any helix.

Changes may be made in the form, construction and arrangement of the parts without departing from the spirit of the invention, and the right is hereby reserved to make all such changes as fairly fall within the scope of the following claims.

The invention is hereby claimed as follows:

1. In a drill grinding machine, means for rotating the drill, grinding means, means to move the drill longitudinally relative to the grinding means, said drill rotating means including a driven gear and a driving pinion, and means to shift said pinion relative to said gear to vary the timed driving relation therebetween during longitudinal movement of said drill.

2. In a drill grinding machine, means for rotating the drill, grinding means, means to move the drill longitudinally relative to the grinding means, said drill rotating means including a driven helical gear and a helical driving pinion, and means to shift said pinion relative to said gear to vary the timed driving relation therebetween during longitudinal movement of said drill.

3. In a drill grinding machine, means for rotating the drill, grinding means, means to move the drill longitudinally relative to the grinding means, said drill rotating means including a driven helical gear and a helical driving pinion, means to shift said pinion relative to said gear to vary the timed driving relation therebetween during longitudinal movement of said drill, and means to oscillate the drill relative to the grinding means in synchronism with the drill rotation for relief grinding.

4. In a drill grinding machine a longitudinally movable table, means to move said table, grinding means relatively fixed with respect to said table, drill carrying means mounted upon said table, means to rotate said drill carrying means including as members a driving helical pinion and a meshing driven helical gear, an angularly movable arm operatively attached to one of said members, a fulcrum for said arm, means pivotally attaching said arm to said table whereby longitudinal movement of said table will actuate said arm to shift one of said members relative to the other.

5. In a drill grinding machine, a longitudinally movable table, means to move said table, grinding means relatively fixed with respect to said table, drill carrying means mounted upon said table, means to rotate said drill carrying means including as members a driving helical pinion and a meshing driven helical gear, an angularly movable arm operatively attached to one of said members, a fulcrum for said arm, means pivotally attaching said arm to said table whereby longitudinal movement of said table will actuate said arm to shift one of said members relative to the other, said fulcrum being adjustable to vary the amplitude of movement of said arm under actuation of said table.

6. In a drill grinding machine a longitudinally movable table, means to move said table, grinding means relatively fixed with respect to said table, drill carrying means mounted upon said table, means to rotate said drill carrying means including as members, a driving helical pinion and a meshing driven helical gear, an angularly movable arm operatively attached to one of said members, a fulcrum for said arm, means pivotally attaching said arm to said table whereby longitudinal movement of said table will actuate said arm to shift one of said members relative to the other, and means manually to adjust the relative position of said members.

7. In a drill grinding machine a longitudinally movable table, means to move said table, grinding means relatively fixed with respect to said table, drill carrying means mounted upon said table, means to rotate said drill carrying means including as members a driving helical pinion and a meshing driven helical gear, an angularly movable arm operatively attached to one of said members, a fulcrum for said arm, means pivotally attaching said arm to said table whereby longitudinal movement of said table will actuate said arm to shift one of said members relative to the other, means manually to adjust the relative position of said members, said last named means comprising a nut pivotally attached to said arm and an operating rod engaging said nut.

8. In a drill grinding machine a longitudinally movable table, means to move said table, grinding means relatively fixed with respect to said table, drill carrying means mounted upon said table, means to rotate said drill carrying means including as members a driving helical pinion and a meshing driven helical gear, an angularly movable arm operatively attached to one of said members, a fulcrum for said arm, means pivotally attaching said arm to said table whereby longitudinal movement of said table will actuate said arm to shift one of said members relative to the other, a fixed member in proximity to said arm and means operatively connecting said fulcrum to said fixed member.

9. In a drill grinding machine a longitudinally movable table, means to move said table, grinding means relatively fixed with respect to said table, drill carrying means mounted upon said table, means to rotate said drill carrying means including as members a driving helical pinion and a meshing driven helical gear, an angularly movable arm operatively attached to one of said members, a fulcrum for said arm, means pivotally attaching said arm to said table whereby longitudinal movement of said table will actuate said arm to shift one of said members relative to the other, means manually to adjust the relative position of said members, said last named means comprising a nut pivotally attached to said arm and an operating rod engaging said nut, said fixed member being adjustable relative to said arm.

WALTER UMBDENSTOCK.

REFERENCES CITED

The following references are of record in the file of this patent:

UNITED STATES PATENTS

| Number | Name | Date |
|---|---|---|
| 286,663 | Wheeler | Oct. 16, 1883 |
| 805,170 | Thomas | Nov. 21, 1905 |
| 1,323,452 | Cogsdill | Dec. 2, 1919 |
| 1,640,994 | Hanson | Aug. 30, 1927 |
| 2,099,724 | Cogsdill | Nov. 23, 1937 |
| 2,192,370 | Wildhaber | Mar. 5, 1940 |
| 2,193,186 | Bannister | Mar. 12, 1940 |

FOREIGN PATENTS

| Number | Country | Date |
|---|---|---|
| 559,483 | Great Britain | Feb. 22, 1944 |